Oct. 19, 1937.  E. ALMDALE  2,096,623
METHOD OF MAKING GROMMETS
Original Filed April 26, 1935
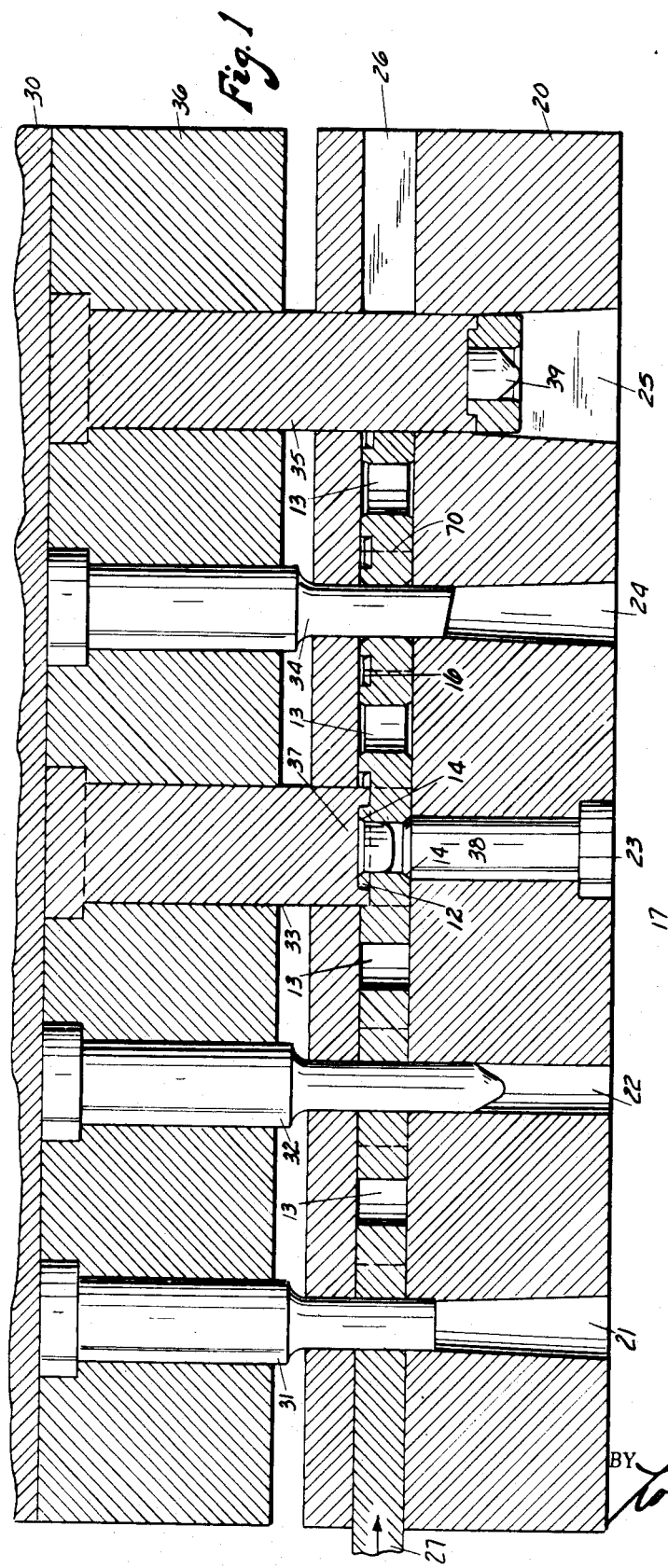
INVENTOR.
EINAR ALMDALE
BY
ATTORNEY.

Patented Oct. 19, 1937

2,096,623

UNITED STATES PATENT OFFICE 2,096,623

METHOD OF MAKING GROMMETS

Einar Almdale, Detroit, Mich., assignor to The Midland Steel Products Company, Cleveland, Ohio, a corporation of Ohio Original application April 26, 1935, Serial No. 18,140, Patent 2,054,187, September 15, 1936. Divided and this application June 3, 1936, Serial No. 83,240

7 Claims. (Cl. 10—86)

This invention relates to a method of manufacturing grommets and clinch nuts which are adapted to be welded to metal plates whereby parts may be secured to the metal plates by attachment to the grommets or nuts, and is a division of my copending application Serial No. 18,140 filed April 26, 1935.

An important object of the invention is to provide a method for forming welding projections on grommets or clinch nuts for projection-welding to metal plates.

Another important object of the invention is to provide a method by which these grommets can be rapidly and cheaply manufactured from bar stock.

Other objects and advantages of the invention will become apparent during the course of the following description.

In the accompanying drawing forming a part of the description and wherein like numerals are employed to designate like parts throughout the several views, Fig. 1 is a longitudinal sectional view through the apparatus for manufacturing the grommets.

Fig. 2 is a bottom elevational view of one form of grommet produced in the apparatus of Fig. 1.

Fig. 3 is a side elevational view of this grommet.

Fig. 4 is a section of a modified form of grommet produced in the apparatus of Fig. 1 and shown applied to a metal plate.

Fig. 5 is a bottom elevational view of this modified form of grommet.

Fig. 6 is a section of another modified form of grommet produced in the apparatus of Fig. 1 and shown attached to a plate, and Fig. 7 is a bottom elevational view of this modified form of grommet.

The grommet or nut 10 shown in Figs. 2 and 3 has a head or body portion of any desired shape herein shown as being polygonal or square. The base or lower face of the nut is provided with an integral centrally disposed circular pilot 12 which has a central threaded opening 13 extending axially therethrough as well as through the head or body of the nut. The opposite ends of this threaded opening 13 are countersunk as at 14 to facilitate assembly of the parts therewith. The pilot 12 is preferably of a height less than the thickness of a metal plate or part to which it is to be attached as shown in the modification in Figs. 4 and 6. The pilot may, if desired, be of such dimensions as to cause its outer end to be flush with the metal plate after the nut has been welded to the plate around the perforation therein.

To facilitate projection welding of the nut to the plate, the base of the body portion thereof is provided at its corners with integral triangular projections 16 which are not as tall as the pilot 12, but are only of sufficient height whereby they will be almost completely fused or melted into the metal of the plate when the welding current is passed therethrough whereby the base of the nut will be flush upon the outer surface of the metal plate. The bases of these triangular projections 16 are tapered as at 17 to merge into the base of the nut as illustrated.

The apparatus for manufacturing this nut is shown in Fig. 1 and comprises a punch press having a stationary die 20 provided with a plurality of die holes 21, 22, 23, 24 and 25, all of which are intersected by a passage 26 extending longitudinally through the die 20 for the slidable reception of a bar or sheet 27 of cold rolled steel or other suitable metal from which the nuts are to be formed. Any suitable mechanism can be employed for manually or automatically feeding the bar stock 27 step by step in the passage 26 with respect to the die holes.

Reciprocally mounted with respect to the stationary die 20 is a reciprocating head or ram 30 to which various forming tools 31, 32, 33, 34 and 35 are clamped by a suitable clamping member 36 fastened to the ram 30 by bolts or other suitable means not illustrated. These forming tools are each axially disposed with respect to the die holes as shown in Fig. 1.

In order to produce the nuts, one end of the bar stock 27 is first fed into the passage 26 a sufficient distance so that the punch 31 will perforate a hole in the bar stock a sufficient distance from the end thereof for the first nut to be produced. Upon elevation of the reciprocating ram 30 the bar stock 27 is moved a step, a distance corresponding substantially to the width of the nut to be produced, to thereby place the initially perforated nut between the tools 31 and 32, and upon downward movement of the ram 30, the punch 31 perforates a hole in the second nut to be produced. The next successive feeding step places the first formed perforation in alignment with the pilot 32 so that the latter enters the first formed perforation upon the next descent of the ram 30, and at the same time the punch 31 perforates another opening in the bar stock 27 which opening will be the hole in the third nut to be produced. The next two successive feeding steps of the bar stock causes the first formed perforation to be aligned with the pilot 37 of the coining tool 33, which upon the next descent of the ram 30 provides the projections 16 and pilot 12 with the countersink 14 in the adjacent end of the nut, and simultaneously therewith, the countersink 14 at the opposite end of the opening 13 by means of a countersink tool 38 disposed in the opening 23 of the die 20. After completion of the coining operation and upon two successive feeding steps of the bar stock 27 the first formed aperture is aligned with the cutting tool 34 to shave and clean up the first formed hole upon the next down stroke of the ram 30. The next two successive feeding steps of the bar stock 27 through the passage 26 brings the first formed perforation in alignment with the pilot 39 of the cutoff tool 35 so that upon the next downstroke of the ram 30 the end of the bar stock is cut off along the dotted line 70 to form the first clinch nut, whereby thereafter and upon each downstroke of the ram, a nut is formed and ejected through the passage 25 into a suitable hopper. The nut is also threaded in a suitable threading machine. The forming tools may be so spaced with respect to each other so as to eliminate the two successive feeding steps required to bring the first formed nut into position with respect to the forming tools, that is, only one reciprocation of the ram 30 will be necessary to feed the bar stock 27 for each successive forming operation. In the method herein described, a nut is produced upon each reciprocation of the ram after the first formed nut has been produced.

Various other forms of grommets or nuts may be formed with the apparatus illustrated in Fig. 1 by simply providing different tools to form the appropriate shape of pilot and welding projections.

In Figs. 4 and 5 is shown another type of nut 50 adapted to be produced by the apparatus of Fig. 1 and comprises a pilot 51 of the same form as pilot 12 hereinbefore described. In this modification the welding projection assumes the form of an annular welding rib 52 concentric with the pilot 51 and spaced therefrom as illustrated at 53. The nut 50 is welded to the plate 54 by inserting the pilot 51 in the aperture 55 and the annular welding rib 52 is fused to the metal plate 54. In order to form the welding rib 52 the coining tool 33 is provided with an appropriate coining surface.

Figs. 6 and 7 illustrate another modified grommet or nut 60 adapted to be produced by the apparatus of Fig. 1 and comprises a pilot 61 similar to the pilot 12 which is surrounded with an annular welding rib 62 chamfered at an angle of approximately 46 degrees to meet the base of the nut and cause the welding rib to terminate in a V-shaped edge which is fused into the metal plate 63 surrounding the perforation 64 therein. The welding rib 62 is formed in the apparatus shown in Fig. 1 by a suitably shaped coining tool 33.

In the two modifications shown in Figs. 4 through 7 the annular welding ribs are fused into the metal plates so as to form a liquid or air tight seal with the plates.

It is to be understood that the nuts may be threaded or unthreaded and various changes in the steps of the method and the shape and arrangement of various parts of the grommets or nuts may be resorted to without departing from the spirit of the invention or the scope of the appended claims.

I claim:

1. A method of forming grommets from continuous bar stock consisting of feeding a bar in successive steps through a punch press, each feeding step taking place as the punch elevates, perforating the stock on the first descent of the punch, piloting a member through the perforation on a subsequent step while perforating the stock for another grommet, forming a pilot and projections around the first perforation with a pilot therein while performing the preceding steps on other portions of the stock.

2. A method of forming grommets from continuous bar stock consisting of feeding a bar in successive steps through a punch press, perforating the stock on one step for one grommet, forming a pilot and projections around the first perforation with a pilot therein on a subsequent step while perforating the stock for another grommet.

3. A method of forming grommets from continuous bar stock consisting of feeding a bar in successive steps through a punch press, perforating the stock on one step for one grommet, forming a pilot and a projection around the first perforation with a pilot therein on a subsequent step while perforating the stock for another grommet, and cutting off a portion of the stock subjected to the preceding steps while performing the preceding steps on other portions of the stock.

4. A method of forming grommets from continuous bar stock consisting of feeding a bar in successive steps through a punch press, perforating the stock on one step for one grommet, forming a projection around the first perforation with a pilot therein on a subsequent step while perforating the stock for another grommet, and cutting off a portion of the stock subjected to the preceding steps while performing the preceding steps on other portions of the stock.

5. The step in the method of forming a grommet consisting of subjecting a perforated body of cold rolled steel to a coining tool having a pilot which is moved into the perforation while the tool compresses portions of the body lengthwise of the perforation to form a depression leaving a pressed up collar around the perforation and projections spaced from the collar, thereby forming a highly worked grommet having condensed grain structure.

6. The method of forming grommets from continuous bar stock consisting of feeding the bar in successive steps through a slot in the die of a punch press, each succeeding feeding step to advance the stock taking place as the punch elevates, perforating the stock on the first descent of the punch, feeding the stock the width of one grommet, perforating the stock on the next descent of the punch and each subsequent descent thereof, extending a pilot through the first perforation on the next descent of the punch, feeding the stock through the slot the width of two grommets and entering a pilot in the first formed perforation while a coining tool compresses portions of the grommet lengthwise of the perforation to form a depression leaving a pressed up collar around the perforation and projections spaced from the collar, feeding the stock through the slot the width of two grommets on successive operations of the press and shaving out the perforation made, after which the stock is moved the width of two grommets and the first perforated grommet is severed from the bar while substantially the ninth grommet is being perforated.

7. The step in the method of forming a grommet consisting of subjecting a perforated body of metal to a coining tool having a pilot which is moved into the perforation while the tool compresses portions of the body lengthwise of the perforation to form a depression leaving upstanding projections spaced from the perforation, thereby forming a highly worked grommet having condensed grain structure.

EINAR ALMDALE.